(12) United States Patent
Yano et al.

(10) Patent No.: US 11,273,745 B2
(45) Date of Patent: Mar. 15, 2022

(54) VEHICLE SEAT, HEADREST AND HEADREST CONTROL SYSTEM

(71) Applicant: TOYOTA BOSHOKU KABUSHIKI KAISHA, Aichi-ken (JP)

(72) Inventors: Komei Yano, Aichi-ken (JP); Kenji Kawano, Aichi-ken (JP); Hidetaka Nagayasu, Aichi-ken (JP); Makoto Asano, Gifu-ken (JP); Osamu Kaneko, Aichi-ken (JP); Hikaru Satou, Aichi-ken (JP)

(73) Assignee: TOYOTA BOSHOKU KABUSHIKI KAISHA, Aichi-ken (JP)

(\*) Notice: Subject to any disclaimer, the term of this patent is extended or adjusted under 35 U.S.C. 154(b) by 477 days.

(21) Appl. No.: 16/446,963

(22) Filed: Jun. 20, 2019

(65) Prior Publication Data

US 2019/0389353 A1  Dec. 26, 2019

(30) Foreign Application Priority Data

Jun. 22, 2018 (JP) .............................. JP2018-118833

(51) Int. Cl.
*B60N 2/02* (2006.01)
*B60N 2/868* (2018.01)
*B60N 2/853* (2018.01)
*B60N 2/888* (2018.01)

(52) U.S. Cl.
CPC .............. *B60N 2/888* (2018.02); *B60N 2/868* (2018.02)

(58) Field of Classification Search
CPC ........... B60N 2/88; B60N 2/894; B60N 2/868
See application file for complete search history.

(56) References Cited

U.S. PATENT DOCUMENTS

| 6,957,858 B2 * | 10/2005 | Yetukuri | ............... | B60N 2/838 297/216.12 |
| 11,148,568 B2 * | 10/2021 | Hong | ..................... | B60N 2/829 |
| 2005/0168020 A1 * | 8/2005 | Yetukuri | ............... | B60N 2/838 297/216.12 |
| 2008/0228359 A1 * | 9/2008 | Uchida | ................ | B60N 2/868 701/49 |
| 2010/0127540 A1 * | 5/2010 | Park | ..................... | B60N 2/888 297/216.12 |

(Continued)

FOREIGN PATENT DOCUMENTS

JP  H 08-336439  12/1996

*Primary Examiner* — Shin H Kim
(74) *Attorney, Agent, or Firm* — Greenblum & Bernstein, P.L.C.

(57) ABSTRACT

A vehicle seat attachable to a vehicle body, the vehicle seat including: a seat back; and a headrest configured to support a head of a seated occupant, the headrest including: a base portion fixed to the seat back; a slide portion slidable in a left-right direction in a state where the head is supported to the base portion; and an electric mechanism configured to slide the slide portion in the left-right direction, and in which the slide portion is configured to be moved by the electric mechanism in a moving direction in which the head moves in the left-right direction due to acceleration in the left-right direction applied when a vehicle moves, the electric mechanism being operated by a control device disposed in the vehicle body in response to a signal from a sensor disposed in the vehicle body, the sensor being configured to detect the moving direction.

11 Claims, 9 Drawing Sheets

(56) References Cited

U.S. PATENT DOCUMENTS

2019/0389353 A1\* 12/2019 Yano ................ B60N 2/888
2020/0062145 A1\* 2/2020 Little ................ B60N 2/0248
2021/0061473 A1\* 3/2021 Mansouri ............ B60N 2/80

\* cited by examiner

VEHICLE SEAT, HEADREST AND HEADREST CONTROL SYSTEM

CROSS-REFERENCE TO RELATED APPLICATIONS

This application claims priority from Japanese Patent Application No. 2018-118833 filed on Jun. 22, 2018, the entire contents of which are incorporated herein by reference.

TECHNICAL FIELD

The present disclosure relates to a vehicle seat, a headrest, and a headrest control system.

BACKGROUND

With respect to a vehicle seat such as a vehicle seat, when a turning operation of a vehicle is performed, an upper body of an occupant seated on a seat tends to move in a left-right direction. At this time, it is known that, as compared with a case where a head supported on a headrest is translated in the left-right direction relative to the upper body, the seated occupant is more likely to feel discomfort when the head is rotated. Here, the rotational movement refers to rolling which is a movement in which the head is swung in the left-right direction around a base of a neck relative to the upper body, or yawing which is a movement in which the head is swung left and right around a vertical axis passing through a center of gravity of the head. The translational movement refers to a movement in which the head moves in the left-right direction together with the upper body without the rotational movement of rolling or yawing relative to the upper body. One method is to restrict the head from moving in the left-right direction together with the upper body so as to prevent the head from rotating relative to the upper body during the turning operation of the vehicle. JP-A-8-336439 discloses a vehicle seat that restricts the head and the upper body. In the vehicle seat disclosed in JP-A-8-336439, a head support that supports the head is disposed on a side portion of a headrest, and a shoulder support that supports the upper body is disposed on a side portion of a seat.

In the above-described conventional technique, the movement of the head and the upper body in the left-right direction is restricted. Accordingly, it is possible to prevent the head from rotating relative to the upper body. However, the head and the upper body are restricted in a narrow range from left and right. Accordingly, there is another problem that a sense of restriction is accompanied and a sense of tightness is felt.

SUMMARY

In view of such a problem, an aspect of the present disclosure is to provide a vehicle seat, a headrest, and a headrest control system that are capable of preventing a head of a seated occupant from rotating relative to an upper body without a sense of restriction.

A first aspect of the present disclosure provides a vehicle seat attachable to a vehicle body, the vehicle seat including: a seat back configured to support an upper body of a seated occupant; and a headrest configured to support a head of the seated occupant, the headrest including: a base portion fixed to the seat back; a slide portion slidable in a left-right direction of the seated occupant in a state where the head is supported to the base portion; and an electric mechanism configured to slide the slide portion in the left-right direction, and in which the slide portion is configured to be moved by the electric mechanism in a moving direction in which the head moves in the left-right direction due to acceleration in the left-right direction applied when a vehicle moves, the electric mechanism being operated by a control device disposed in the vehicle body in response to a signal from a sensor disposed in the vehicle body, the sensor being configured to detect the moving direction.

An second aspect of the present disclosure provides a headrest attachable to a seat back which is configured to support an upper body of a seated occupant in a vehicle seat attachable to a vehicle body, and configured to support a head of the seated occupant, the headrest including: a base portion fixed to the seat back; a slide portion slidable in a left-right direction of the seated occupant in a state where the head is supported to the base portion; and an electric mechanism configured to slide the slide portion in the left-right direction, in which the slide portion is configured to be moved by the electric mechanism in a moving direction in which the head moves in the left-right direction due to acceleration in the left-right direction applied when a vehicle moves, the electric mechanism being operated by a control device disposed in the vehicle body in response to a signal from a sensor disposed in the vehicle body, the sensor being configured to detect the moving direction.

An third aspect of the present disclosure provides a control system of a headrest attachable to a seat back which is configured to support an upper body of a seated occupant in a vehicle seat attachable to a vehicle body, wherein the headrest which is configured to support a head of the seated occupant includes: a base portion fixed to the seat back; a slide portion slidable in a left-right direction of the seated occupant in a state where the head is supported to the base portion; and an electric mechanism configured to slide the slide portion in the left-right direction, in which the control system includes: a control device disposed in the vehicle body; and a sensor disposed in the vehicle body and configured to detect a moving direction in which the head moves in the left-right direction due to acceleration in the left-right direction applied when a vehicle moves, and in which the control device is configured to operate the electric mechanism to move the slide portion in the moving direction in response to a signal from the sensor.

DETAILED DESCRIPTION

Figure 1:
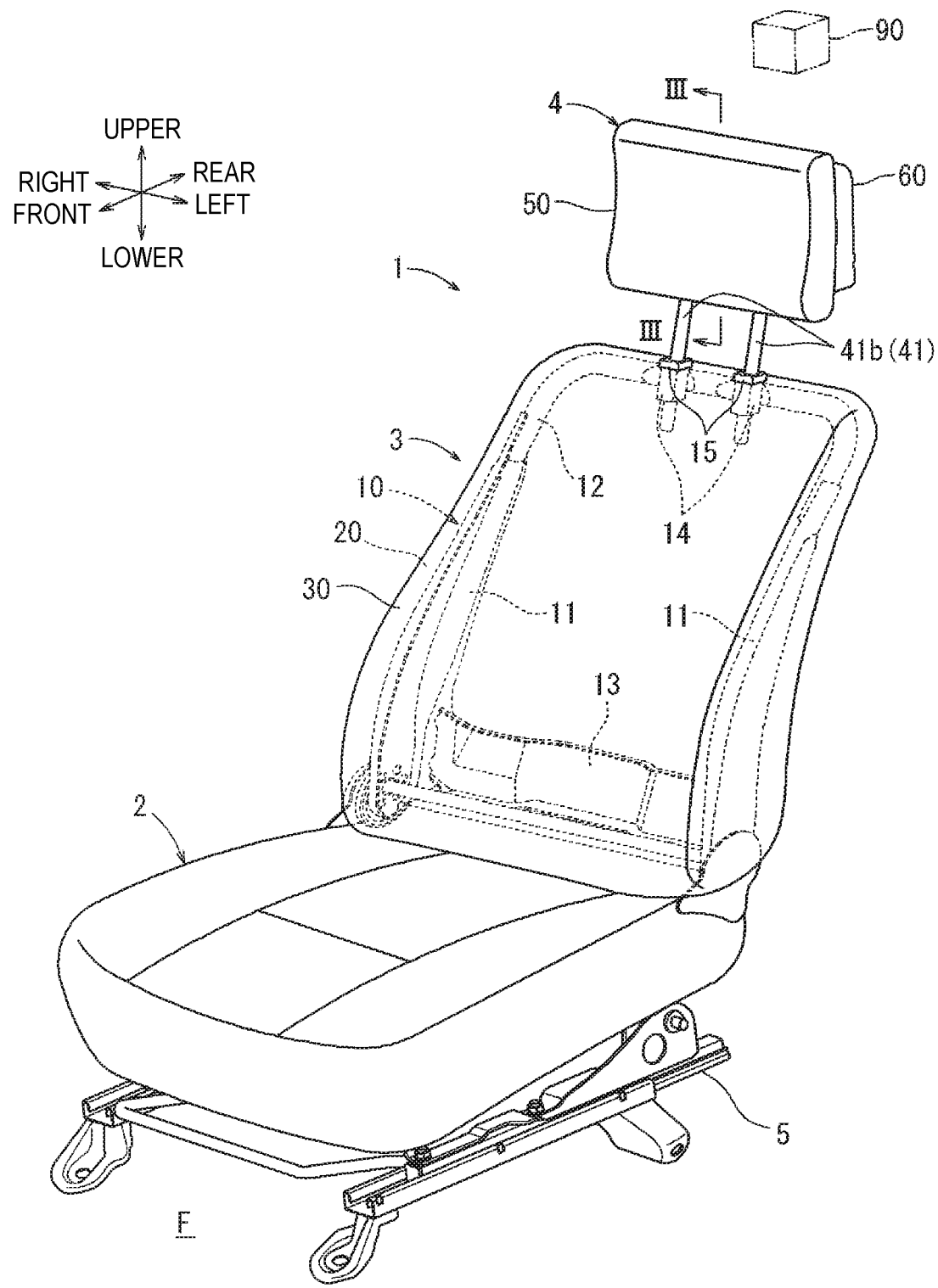
FIG. 1 is a perspective view of an automobile seat according to an embodiment of the present disclosure as viewed from oblique front.

FIGS. 1 to 6B show an embodiment of the present disclosure. The present embodiment is an example in which the present disclosure is applied to an automobile seat 1. In the drawings, arrows indicate directions of an automobile and the automobile seat 1 when the automobile seat 1 is attached to a floor F of the automobile. That is, a front-rear direction of the automobile seat 1 coincides with a front-rear direction of the automobile, and a left-right direction of the automobile seat 1 is a seat width direction and coincides with a vehicle width direction which is a left-right direction of the automobile. In the following description, description relating to directions uses these directions as a reference.

As illustrated in FIG. 1, the automobile seat 1 according to the present embodiment includes a seat cushion 2 configured to support buttocks and thighs of a seated occupant, a seat back 3 configured to support a back of the seated occupant, and a headrest 4 configured to support a head of the seated occupant. The seat cushion 2 is attached to the floor F via a pair of left and right slide rails 5 extending in a front-rear direction. A lower end portion of the seat back 3 is attached to a rear end portion of the seat cushion 2 via a recliner (not illustrated), and an inclination angle of the seat back 3 can be adjusted with respect to the seat cushion 2. The seat cushion 2 has a known configuration, and therefore, a description thereof is omitted. The seat back 3 and the headrest 4 are described. Here, the automobile seat 1 and the floor F correspond to a "vehicle seat" and a "vehicle body" in the claims, respectively.

As illustrated in FIG. 1, the seat back 3 includes a back frame 10 forming a framework, a back pad 20 which is a cushion material and forms an outer shape of the seat back 3, and a back cover 30 which is a cover material and is configured to cover the back pad 20. The back frame 10 is formed in a rectangular frame shape along the outer shape of the seat back 3 in front view. Specifically, the back frame 10 includes a pair of left and right side frames 11 made of steel plate members and elongated in an upper-lower direction, a pipe-shaped upper frame 12 connecting upper end portions of the side frames 11, and a lower panel 13 made of a steel plate and provided in a bridging manner between lower end portion sides of the side frames 11. Each of the side frames 11 has a substantially U shape in which a front edge portion and a rear edge portion thereof are bent toward an inside of the seat and a horizontal cross section is opened toward the inside of the seat, so that strength against bending and twisting is increased. Two holders 14 configured to support headrest supports 15, into which stay portions 41b of the headrest 4 are inserted, are attached to the upper frame 12.

Figure 2:
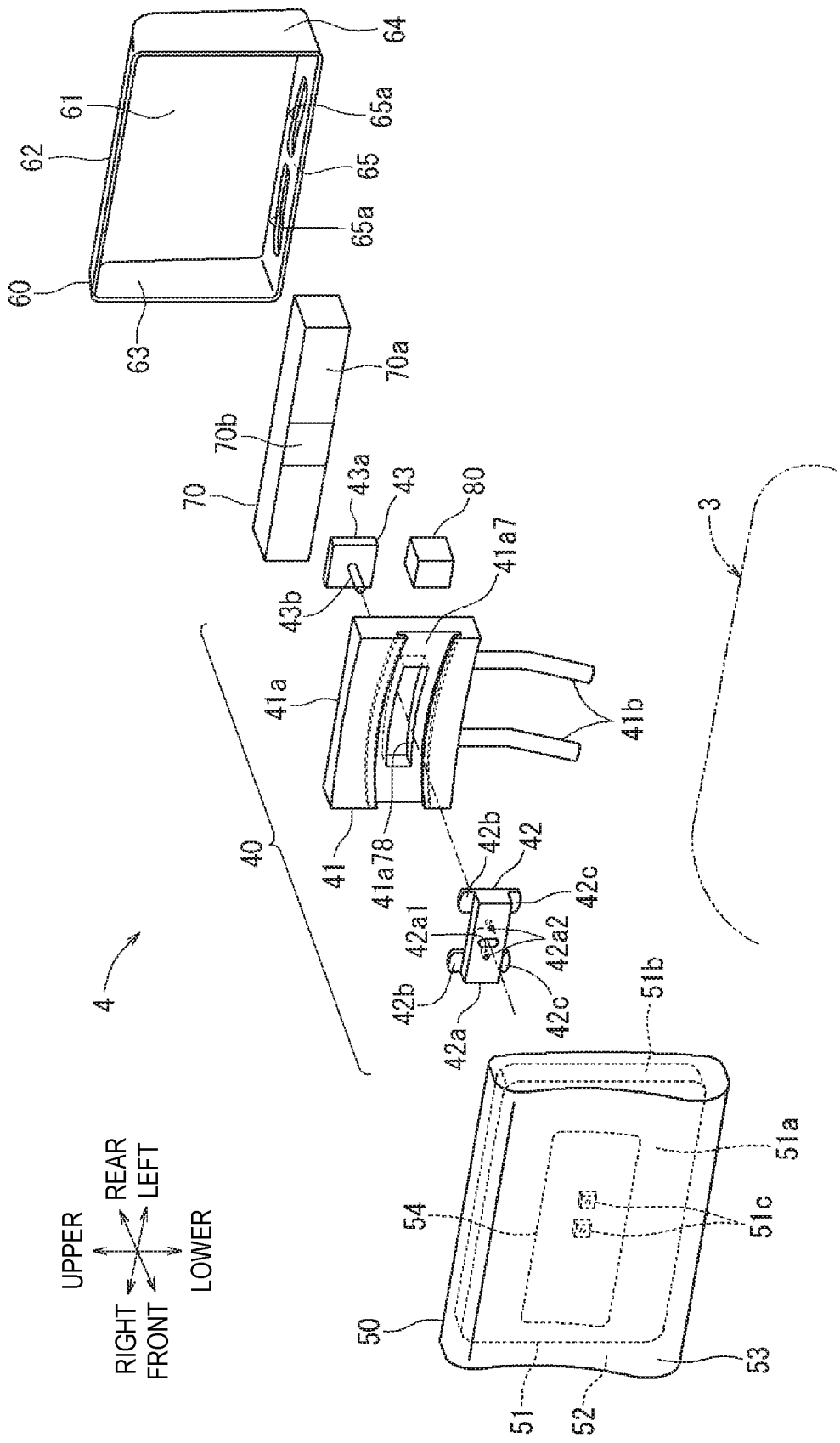
FIG. 2 is an exploded perspective view of a headrest in the automobile seat according to the embodiment.

As illustrated in FIG. 2, the headrest 4 includes a frame body 40 forming a framework, a cushion body 50 which abuts on the head of the seated occupant and is configured to elastically support the head of the seated occupant, a cover body 60 which is attached to the cushion body 50 to cover the frame body 40 from the rear, an electric mechanism 70 configured to move the cushion body 50 in the left-right direction, and a control device 80 configured to control an operation of the electric mechanism 70.

As illustrated in FIGS. 2 to 5, the frame body 40 includes a frame main body 41 forming a main body of the framework, a slide body 42 slidably attached to the frame main body 41 in the left-right direction, and a control member 43 configured to control a movement of the slide body 42 in the left-right direction.

Figure 4:
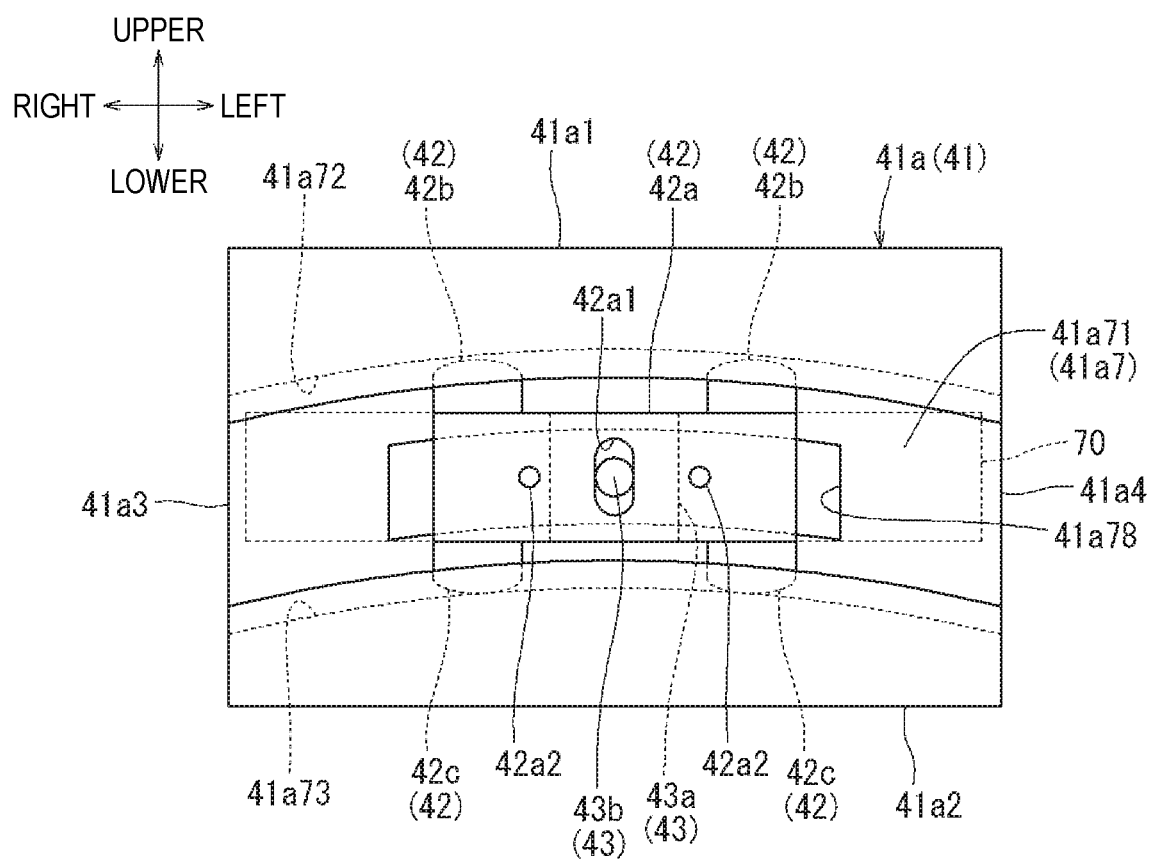
FIG. 4 is a front view of a frame structure of the headrest in the automobile seat according to the embodiment as viewed from the front.
Figure 5:
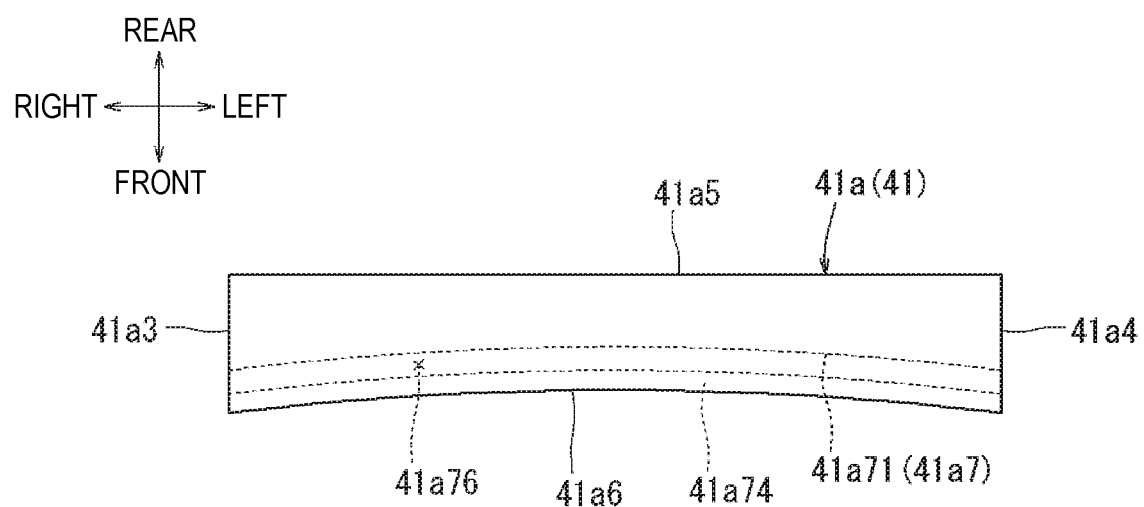
FIG. 5 is a plan view of the frame structure of the headrest in the automobile seat according to the embodiment as viewed from above.

The frame main body 41 includes a base plate portion 41a made of, for example, a resin having a substantially rectangular parallelepiped shape, and a pair of left and right stay portions 41b extending downward from the base plate portion 41a. As illustrated in FIG. 4, the base plate portion 41a is formed in a rectangular shape with an upper surface 41a1 and a lower surface 41a2 as long sides extending in the left-right direction, and a right surface 41a3 and a left surface 41a4 as short sides extending in the upper-lower direction in front view. Further, as illustrated in FIG. 5, in the base plate portion 41a, a rear surface 41a5 is formed to be a straight line extending in the left-right direction, and the front surface 41a6 is formed to be a part of a curve having a radius of 1000 mm which is convex toward the rear in top view. That is, the front surface 41a6 is formed as a part of a cylindrical surface having a radius of 1000 mm. The radius of 1000 mm can be appropriately selected between 500 mm and 2000 mm. The front surface 41a6 is formed such that a center portion of the base plate portion 41a in the left-right direction is located at a rearmost position, and is formed to be convex toward the rear. The right surface 41a3 and the left surface 41a4 are formed in a rectangular shape with long sides in the upper-lower direction and short sides in the front-rear direction in side view. A groove 41a7 recessed toward the rear is provided in a substantially central part of the front surface 41a6 in the upper-lower direction so as to extend in the left-right direction while curving in the upper-lower direction. The groove 41a7 includes a groove bottom surface 41a71, a groove upper surface 41a72, and a groove lower surface 41a73. The groove bottom surface 41a71 is formed to extend in the left-right direction parallel to the front surface 41a6, and is formed to be a part of a curve having a radius of 1000 mm which is convex toward the rear in top view. That is, similarly to the front surface 41a6, the groove bottom surface 41a71 is formed as a part of a cylindrical surface having a radius of 1000 mm. Therefore, the radius of 1000 mm can also be appropriately selected between 500 mm and 2000 mm in accordance with the front surface 41a6. The groove upper surface 41a72 is formed to be a part of a curve having a radius of 400 mm which is convex upward in front view. That is, the groove upper surface 41a72 is formed as a part of a cylindrical surface having a radius of 400 mm. The radius of 400 mm can be appropriately selected between 300 mm and 600 mm. The groove lower surface 41a73 is formed as a circular arc which has the same center as the groove upper surface 41a72 and whose radius is smaller by a distance between the groove lower surface 41a73 and the groove upper surface 41a72 in the upper-lower direction. The groove upper surface 41a72 and the groove lower surface 41a73 are formed to be convex upward such that the center portion of the base plate portion 41a in the left-right direction is located at the uppermost position. An upper canopy portion 41a74 extending in parallel with the groove bottom surface 41a71 is provided downward from a front end portion of the groove upper surface 41a72. Further, a lower canopy portion 41a75 extending in parallel with the groove bottom surface 41a71 is provided upward from a front end portion of the groove lower surface 41a73. An overhang length of the upper canopy portion 41a74 from the groove upper surface 41a72 and an overhang length of the lower canopy portion 41a75 from the groove lower surface 41a73 are the same and are approximately ⅒ of a length of the groove bottom surface 41a71 in the upper-lower direction. An upper guide rail portion 41a76 is formed between the upper canopy portion 41a74 and the groove bottom surface 41a71 to insert and slide a distal end portion of an upper protruding piece 42b of the slide body 42 described later. A lower guide rail portion 41a77 is formed between the lower canopy portion 41*a*75 and the groove bottom surface 41*a*71 to insert and slide a distal end portion of a lower protruding piece 42*c* of the slide body 42 described later. A through hole 41*a*78, which has a length in the left-right direction and a length in the upper-lower direction of approximately half a length of the groove bottom surface 41*a*71 in the left-right direction and a length of the groove bottom surface 41*a*71 in the upper-lower direction, is formed at a central part of the groove bottom surface 41*a*71 in the left-right direction and the upper-lower direction between the groove bottom surface 41*a*71 and the rear surface 41*a*5. An upper end surface and a lower end surface of the through hole 41*a*78 are formed in parallel with the groove upper surface 41*a*72 and the groove lower surface 41*a*73 in front view, respectively. That is, the upper end surface and the lower end surface of the through hole 41*a*78 are formed as a part of a curve having a radius of 400 mm which is convex upward in front view. Therefore, the radius of 400 mm can be appropriately selected between 300 mm and 600 mm in accordance with the groove upper surface 41*a*72 and the groove lower surface 41*a*73. The upper end surface and the lower end surface of the through hole 41*a*78 are not necessarily curved.

Figure 3:
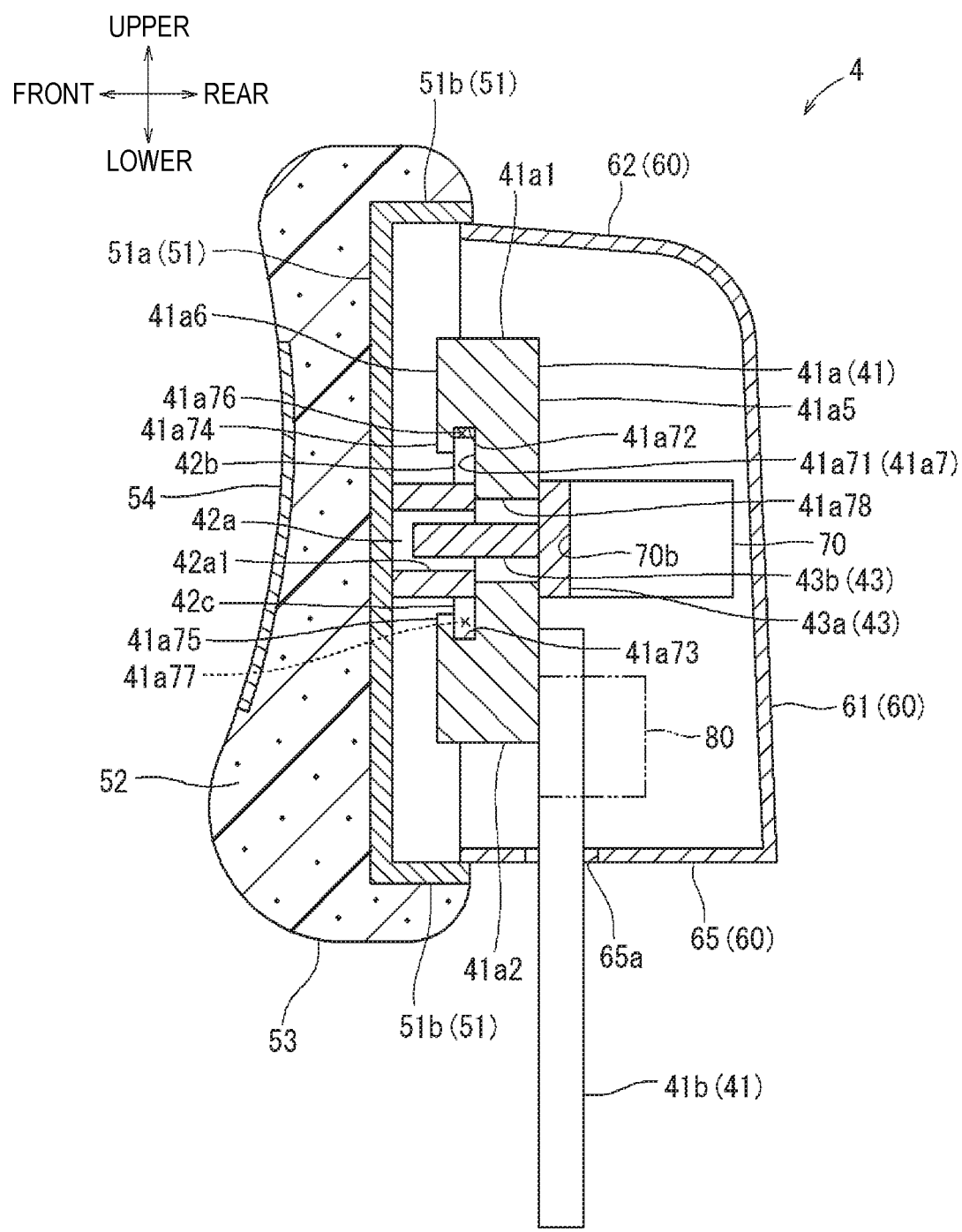
FIG. 3 is a cross sectional view taken along a line III-III in FIG. 1.

As illustrated in FIGS. 2 and 3, an upper end portion side of each of the pair of left and right stay portions 41*b* is fixed to a lower end portion side of the rear surface 41*a*5 of the base plate portion 41*a*. The stay portion 41*b* is a member made of a metal pipe, and a lower end portion side of the stay portion 41*b* is inserted and supported in the holder 14 via the headrest support 15. Here, the frame main body 41 corresponds to a "base portion" in the claims.

As illustrated in FIGS. 2 to 4, the slide body 42 includes a substantially rectangular main body portion 42*a* made of resin or the like, the pair of left and right upper protruding pieces 42*b* provided on an upper portion of the main body portion 42*a*, and the pair of left and right lower protruding pieces 42*c* which are provided on a lower portion of the main body portion 42*a*. Specifically, as illustrated in FIG. 4, the main body portion 42*a* has a rectangular shape in which a longitudinal direction is the left-right direction in front view, and is formed such that a length in the left-right direction is slightly shorter than the length of the through hole 41*a*78 in the left-right direction and a length in the upper-lower direction is approximately half the length of the groove bottom surface 41*a*71 in the upper-lower direction. At a rear end portion of an upper surface of the main body portion 42*a*, a plate-shaped upper protruding piece 42*b* is formed at each of left and right end portions thereof. At a rear end portion of a lower surface of the main body portion 42*a*, a plate-shaped lower protruding piece 42*c* is formed at each of left and right end portions thereof. A length (plate thickness) of the upper protruding piece 42*b* and the lower protruding piece 42*c* in the front-rear direction is set to be slightly smaller than a length of the upper guide rail portion 41*a*76 and the lower guide rail portion 41*a*77 in the front-rear direction, respectively. A distance between an upper end portion of a left upper protruding piece 42*b* and a lower end portion of a left lower protruding piece 42*c* and a distance between an upper end portion of a right upper protruding piece 42*b* and a lower end portion of a right lower protruding piece 42*c* are set to be slightly shorter than the length (distance between the groove upper surface 41*a*72 and the groove lower surface 41*a*73 in the upper-lower direction) of the groove bottom surface 41*a*71 in the upper-lower direction. The upper end portion of the upper protruding piece 42*b* and the lower end portion of the lower protruding piece 42*c* are formed in an R shape. Accordingly, the slide body 42 can slide leftward and rightward relative to the frame main body 41 such that the upper end portion of the upper protruding piece 42*b* and the lower end portion of the lower protruding piece 42*c* are inserted into the upper guide rail portion 41*a*76 and the lower guide rail portion 41*a*77 of the frame main body 41. A through long hole 42*a*1 having a long axis in the upper-lower direction is formed at a central part of the main body portion 42*a* in the left-right direction so as to penetrate in the front-rear direction. The long axis of the through long hole 42*a*1 is set slightly shorter than the length of the through hole 41*a*78 in the upper-lower direction, and a short axis of the through long hole 42*al* is set to be slightly larger than a diameter of a connection pin 43*b* of the control member 43 described later. Accordingly, the connection pin 43*b* can slide in the upper-lower direction so as to be inserted into the through long hole 42*a*1, while the connection pin 43*b* does not abut on the upper and lower end portions of the through long hole 42*a*1 when the connection pin 43*b* moves inside the through hole 41*a*78 in the left-right direction. A pair of left and right screw holes 42*a*2 are formed between a front surface and a rear surface of the main body portion 42*a*. As described later, the slide body 42 is fastened and fixed to the cushion body 50 through a screw in the screw hole 42*a*2.

As illustrated in FIGS. 2 to 4, the control member 43 is a member in which a cylindrical connection pin 43*b* is erected at a central part of a square plate portion 43*a* A length of one side of the plate portion 43*a* is set to be substantially equal to a length of the main body portion 42*a* of the slide body 42 in the upper-lower direction, and a length of the connection pin 43*b* in an axial direction is set to be slightly longer than a length of the base plate portion 41*a* of the frame main body 41 in the front-rear direction. Accordingly, a distal end portion (front end portion) of the connection pin 43*b* is accommodated in the through long hole 42*al* in a state where the slide body 42 is attached to the base plate portion 41*a* when the connection pin 43*b* is inserted through the through hole 41*a*78 of the base plate portion 41*a* and the through long hole 42*a*1 of the slide body 42 and a front surface of the plate portion 43*a* abuts on a rear surface 41*a*5 of the base plate portion 41*a*.

As illustrated in FIGS. 2 and 3, the cushion body 50 includes a box-shaped cushion body frame 51 made of resin and is opened toward the rear, and a cushion portion 52 made of urethane foam and disposed so as to cover a front surface portion, an upper side surface portion, a lower side surface portion, a left side surface portion, and a right side surface portion, which are in an outer side of the cushion body frame 51. The cushion body frame 51 includes a bottom surface portion 51*a* which is rectangular in front view and a side surface portion 51*b* which is erected toward the rear from an outer peripheral edge portion of the bottom surface portion 51*a*. A pair of nuts 51*c* are disposed at positions symmetric in the left-right direction with respect to a center line in the left-right direction at a central part of a rear side surface of the bottom surface portion 51*a* in the upper-lower direction. An interval between the nuts 51*c* is set to be the same as an interval between the screw holes 42*a*2 of the main body portion 42*a*. A surface of the cushion portion 52 is covered with a cover material 53 made of fabric. The surface of the cushion portion 52 may be covered with genuine leather, synthetic leather, or the like. A pressure sensor 54 having a rectangular plate shape in front view is disposed between the cover material 53 and the cushion portion 52 at a central part of a front surface side of the cushion body 50. The pressure sensor 54 is configured to detect pressure at which the head of the seated occupant abuts on the cushion body 50 and presses the cushion body 50. The pressure sensor 54 is electrically connected to the control device 80, so that it is possible to transmit a detected pressure signal to the control device 80. Here, the pressure sensor 54 corresponds to a "sensor" in the claims.

As illustrated in FIGS. 2 and 3, the cover body 60 is a box-shaped member which is made of resin and is opened substantially toward the front. The cover body 60 includes a bottom wall portion 61 which is rectangular in front view, and an upper side wall portion 62, a right side wall portion 63, a left side wall portion 64, and a lower side wall portion 65 which are erected toward the front from an outer peripheral edge portion of the bottom wall portion 61. The upper wall portion 62 is formed slightly inclined forward and upward from an upper end edge portion of the bottom wall portion 61. The right side wall portion 63, the left side wall portion 64, and the lower side wall portion 65 are respectively erected substantially perpendicularly to the bottom wall portion 61 from a right end edge portion, a left end edge portion, and a lower end edge portion of the bottom wall portion 61. Front end edges of the upper wall portion 62, the right side wall portion 63, the left side wall portion 64, and the lower side wall portion 65 are formed so as to fit inside the side surface portion 51b of the cushion body frame 51. A pair of curved long holes 65a penetrating in the upper-lower direction are formed in the lower side wall portion 65 at symmetrical positions in the left-right direction with respect to a center line of the bottom wall portion 61 in the left-right direction. A long axis of the long hole 65a is formed to be a part of a curve having a radius of 1000 mm which is convex toward the rear. The long hole 65a is formed such that the stay portion 41b is loosely fitted, and is formed such that the cover body 60 is integrated with the cushion body 50 to allow the cover body 60 to move relative to the frame main body 41 in the left-right direction when the headrest 4 is attached to the seat back 3.

As illustrated in FIGS. 2 and 3, the electric mechanism 70 is a linear motor having a rectangular parallelepiped shape. A main body portion 70a is fixed to the base plate portion 41a, and a moving portion 70b is movable in the left-right direction. A surface of the plate portion 43a of the control member 43 opposite to the connection pin 43b is connected to the moving portion 70b. The control device 80 is fixed to the base plate portion 41a and is electrically connected to the electric mechanism 70 and the pressure sensor 54. The control device 80 is configured to control an operation of the electric mechanism 70 in response to a signal from the pressure sensor 54.

An assembly procedure of the headrest 4 is described. As illustrated in FIGS. 2 to 4, first, the upper protruding piece 42b and the lower protruding piece 42c of the slide body 42 are inserted into the upper guide rail portion 41a76 and the lower guide rail portion 41a77 of the base plate portion 41a of the frame main body 41, respectively. The insertion is performed while the upper protruding piece 42b and the lower protruding piece 42c are moved in the left-right direction from a right end portion or a left end portion of each of the upper guide rail portion 41a76 and the lower guide rail portion 41a77. Accordingly, the slide body 42 is slidable relative to the frame main body 41 in the left-right direction such that an upper end portion of the upper protruding piece 42b and a lower end portion of the lower protruding piece 42c are respectively inserted into the upper guide rail portion 41a76 and the lower guide rail portion 41a77. Then, the screw holes 42a2 of the main body portion 42a are caused to coincide with the nuts 51c of the cushion body frame 51 of the cushion body 50 assembled in advance, and are fastened and fixed by screws (not illustrated). Next, the connection pin 43b of the control member 43 attached to the moving portion 70b of the electric mechanism 70 is passed through the through hole 41a78 and the through long hole 42a1 of the slide body 42 from the distal end portion (front end portion) of the connection pin 43b to fix the electric mechanism 70 to the base plate portion 41a and to fix the control device 80 to the base plate portion 41a. Then, the control device 80 and the pressure sensor 54 are electrically connected for the control device 80. Finally, the cover body 60 is attached to the cushion body frame 51 in a state where the stay portion 41b is inserted into the long hole 65a of the cover body 60. Here, the cushion body 50 and the slide body 42 correspond to a "slide portion" in the claims.

Figure 6A:
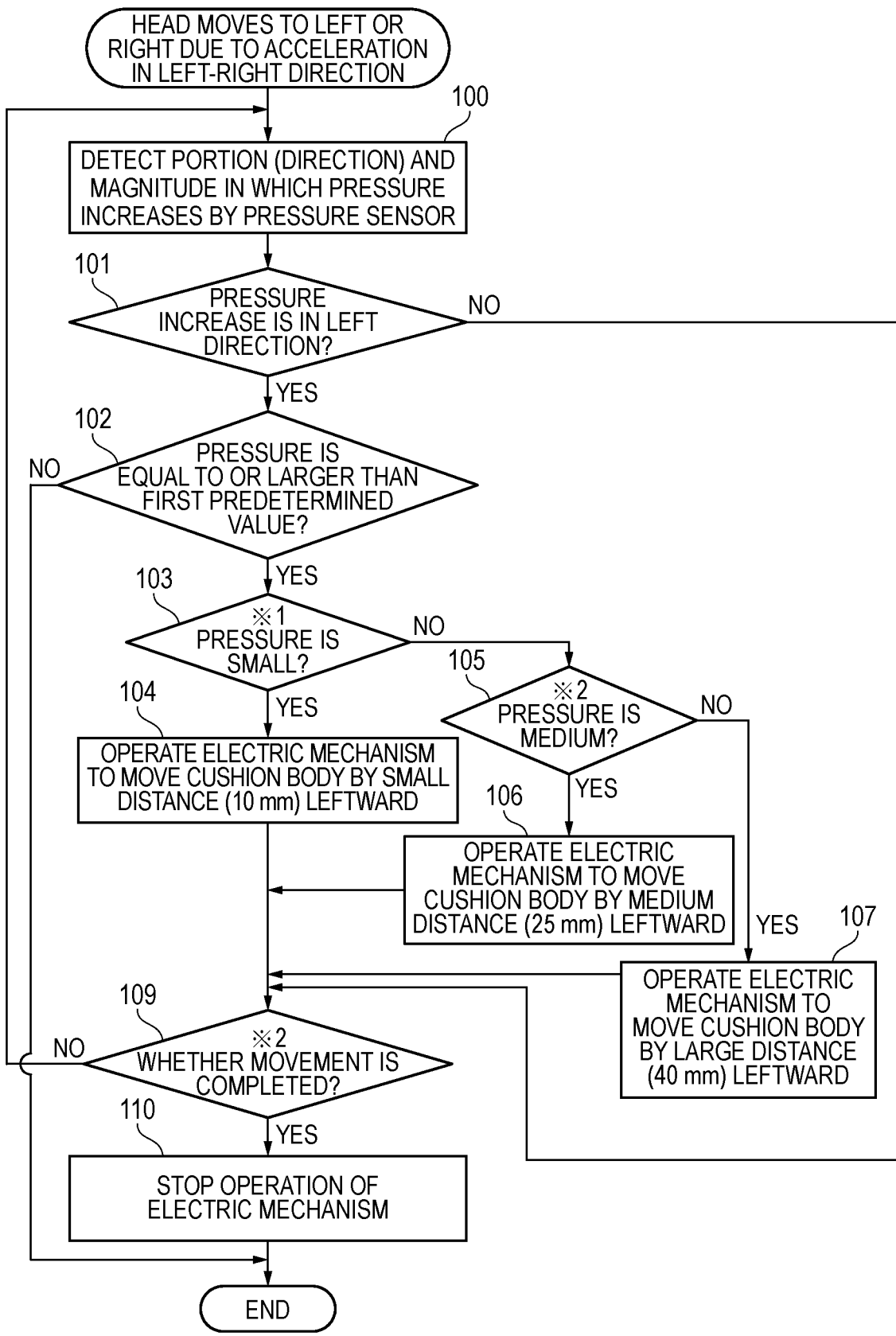
FIGS. 6A and 6B are a flowchart showing operation of the headrest in the automobile seat according to the embodiment.
Figure 6B:
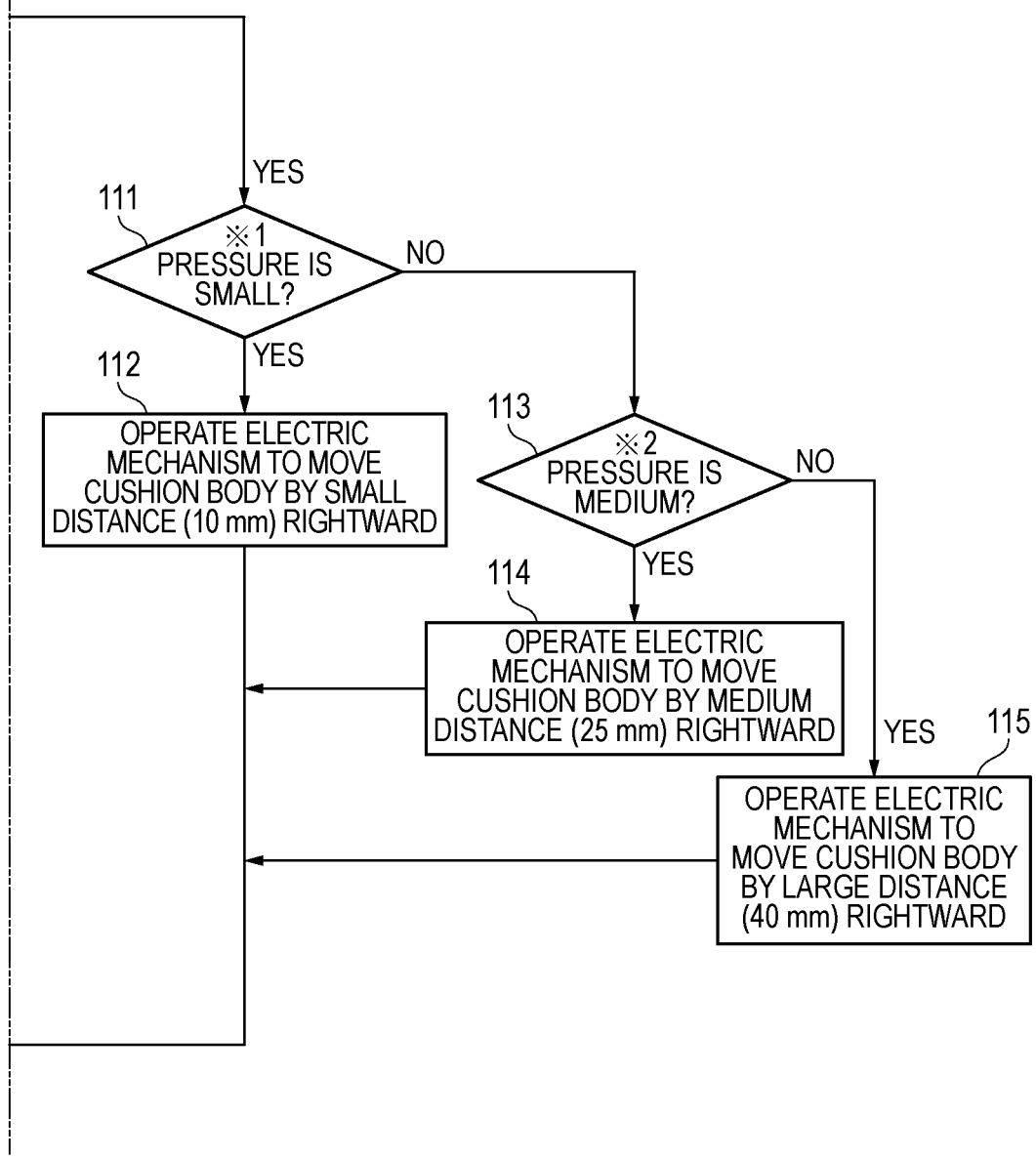

A control flow for controlling the electric mechanism 70 by the control device 80 which is a control system of the headrest 4 is described with based on FIGS. 6A and 6B. When the head of the seated occupant moves leftward or rightward due to acceleration in the left-right direction, in step 100, the pressure sensor 54 detects a direction in which pressure increases and magnitude thereof. Then, a process proceeds to step 102 when the pressure sensor 54 detects that the pressure increase is in the left direction in step 101, and the process proceeds to step 111 when the pressure sensor 54 detects that the pressure increase is not in the left direction (when the pressure increase is in the right direction) in step 101. Here, the direction in which the pressure increases and which is detected by the pressure sensor 54 corresponds to a "moving direction" in the claims.

In step 102, when the pressure detected by the pressure sensor 54 is equal to or larger than a first predetermined value, the process proceeds to step 103, and when the pressure detected by the pressure sensor 54 is equal to or lower than the first predetermined value, the process is terminated.

In step 103, when the pressure detected by the pressure sensor 54 is small (when the pressure detected by the pressure sensor 54 is equal to or larger than the first predetermined value and equal to or lower than a second predetermined value), the process proceeds to step 104 in which the control device 80 operates the electric mechanism 70 to move the cushion body 50 by a small distance (for example, 10 mm) leftward. When the pressure detected by the pressure sensor 54 is medium or large (when the pressure detected by the pressure sensor 54 is larger than the second predetermined value), the process proceeds to step 105.

In step 105, when the pressure detected by the pressure sensor 54 is medium (when the pressure detected by the pressure sensor 54 is equal to or larger than the second predetermined value and equal to or lower than a third predetermined value), the process proceeds to step 106 in which the control device 80 operates the electric mechanism 70 to move the cushion body 50 by a medium distance (for example, 25 mm) leftward. When the pressure detected by the pressure sensor 54 is large (when the pressure detected by the pressure sensor 54 is larger than the third predetermined value), the process proceeds to step 107 in which the control device 80 operates the electric mechanism 70 to move the cushion body 50 by a large distance (for example, 40 mm) leftward.

After step 104, step 106, and step 107, the process proceeds to step 109. In step 109, whether the small movement, the medium movement, and the large movement are completed is determined based on whether the pressure detected by the pressure sensor 54 is equal to or lower than the small value (whether the pressure detected by the pressure sensor 54 is equal to or lower than the first predetermined value). If it is determined that the movement is completed, the process proceeds to step 110 in which the operation of the electric mechanism 70 is stopped. If it is not determined that the movement is completed, the process returns to step 101.

Steps 111 to 115 are the same as the flow of steps 103 to 107 only except that the control device 80 operates the electric mechanism 70 to move the cushion body 50 rightward.

The present embodiment configured as described above has the following advantageous effects. When the upper body of the seated occupant moves in the left-right direction due to the acceleration in the left-right direction applied when the vehicle moves, the cushion body 50 is moved by the electric mechanism 70 in a direction which is detected by the pressure sensor 54 and in which the pressure increases in the left-right direction. Accordingly, the head of the seated occupant is translated together with the upper body, so that rotational movement of yawing relative to the headrest 4 is less likely to occur. Therefore, discomfort to the seated occupant can be less likely to occur.

The control device 80 operates the electric mechanism 70 so as to increase a slide amount of the cushion body 50 as the pressure detected by the pressure sensor 54 increases. Accordingly, when the acceleration in the left-right direction applied during the movement of the automobile is large, the head of the seated occupant is rotated more largely relative to the headrest 4 and the pressure detected by the pressure sensor 54 increases. As the pressure increases, the cushion body 50 is slid more largely. Therefore, the head of the seated occupant is translated together with the upper body, so that rotational movement of yawing relative to the headrest 4 is less likely to occur.

Further, the cushion body 50 slides in the left-right direction on a circular arc having a radius of 1000 mm and having a center on a seating surface side on a center line of the seat back 3 in the left-right direction in top view. When the head of the seated occupant is supported on the cushion body 50 and slides in the left-right direction, the head of the seated occupant is supported to be projected forward as the head of the seated occupant approaches end portions of a slide movement trajectory in the left-right direction. Accordingly, the head is supported from left and right side surfaces so that rotational movement of yawing is less likely to occur. The head of the seated occupant is less likely to rotate relative to the upper body, so that discomfort can be less likely to occur. Furthermore, the cushion body 50 slides in the left-right direction on a circular arc having a radius of 400 mm and having a center on a lower side of the headrest 4 on a center line of the seat back 3 in the left-right direction in front view. When the head of the seated occupant is supported on the cushion body 50 and slides in the left-right direction, the head of the seated occupant is supported to be projected downward as the head of the seated occupant approaches the left and right ends of the slide movement trajectory. Accordingly, the head moves integrally with the upper body, so that a movement in the upper-lower direction relative to the headrest is less likely to occur. The head of the seated occupant is less likely to deviate from the headrest, so that discomfort can be less likely to occur. A trajectory drawn when any part of the cushion body 50 and the slide body 42 slides corresponds to a "slide movement trajectory" in the claims.

While specific embodiments have been described above, the present disclosure is not limited to appearances and configurations in the embodiments, and various modifications, additions, and deletions are possible without changing the spirit of the present disclosure. Examples thereof include the following.

Figure 7A:
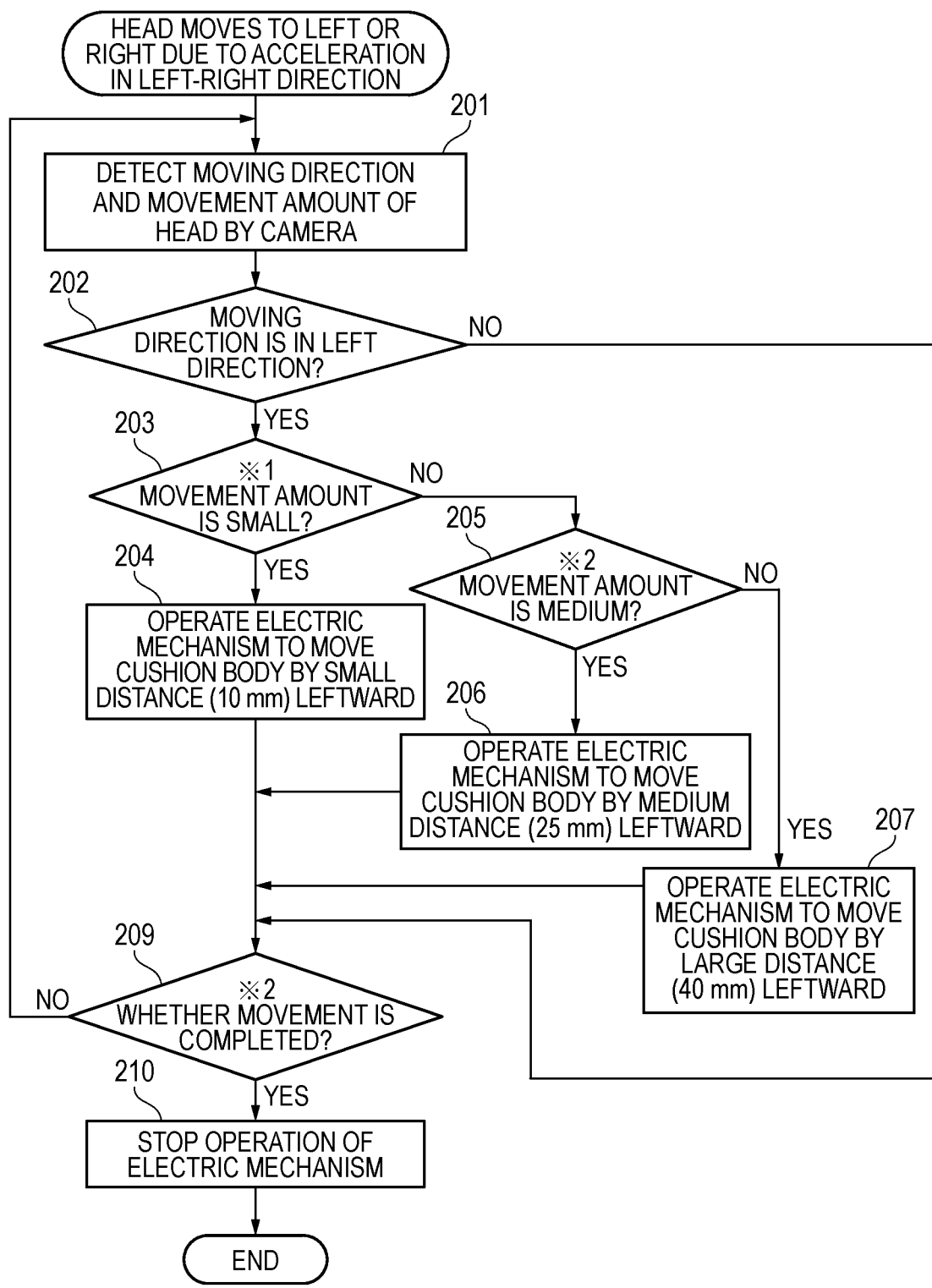
FIGS. 7A and 7B are a flowchart showing operation of the headrest in the automobile seat according to another embodiment.
Figure 7B:
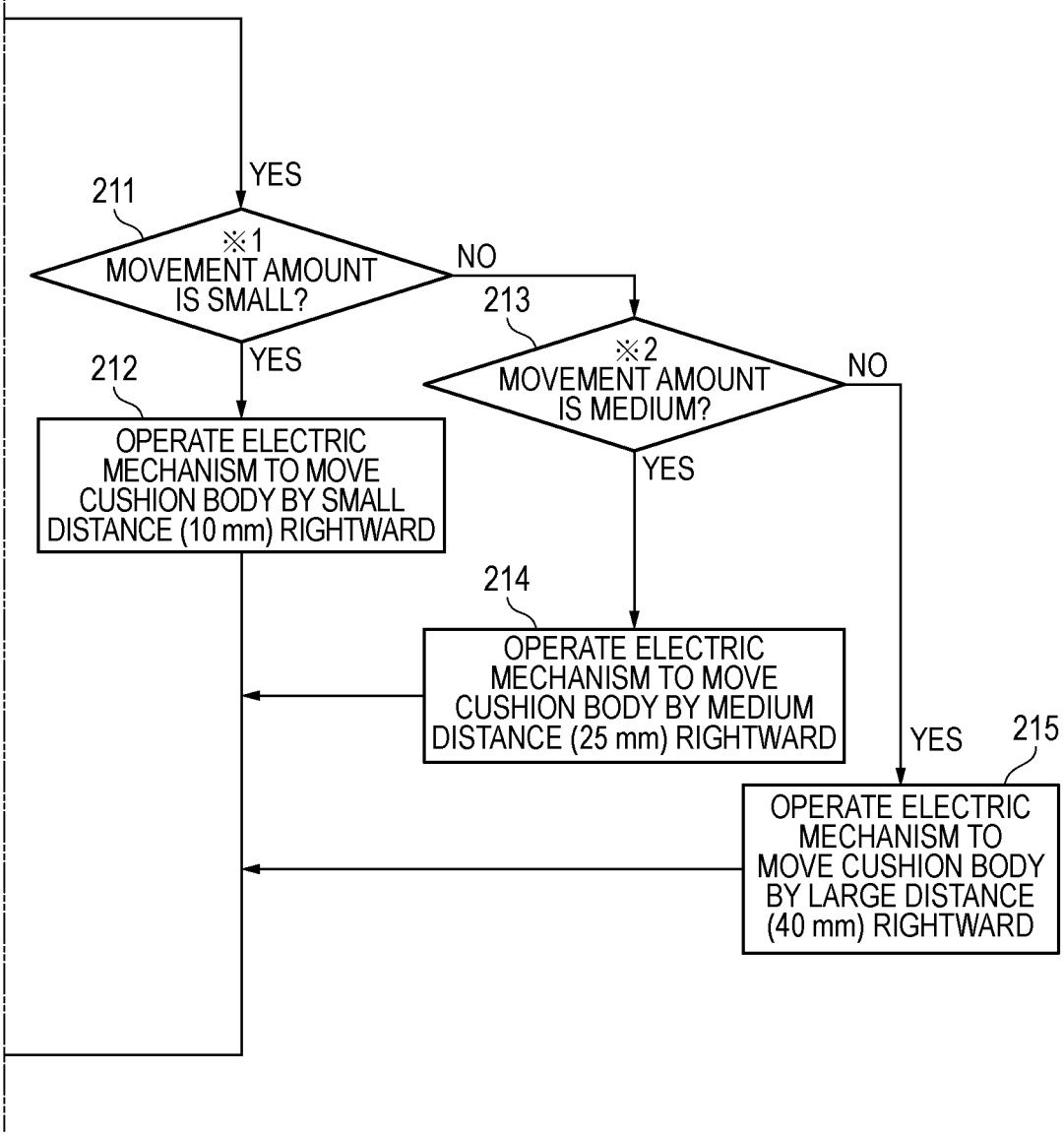

1. In the above embodiment, the movement of the head of the seated occupant is detected by the pressure sensor 54. However, the present disclosure is not limited thereto, and the movement of the head of the seated occupant may be detected by a camera 90 (see FIG. 1) attached to an automobile body above the automobile seat 1. A control flow for controlling the electric mechanism 70 by the control device 80 which is the control system of the headrest 4 when the movement of the head of the seated occupant is detected by the camera 90 according to another embodiment is described with reference to FIGS. 7A and 7B. An only difference from the above embodiment is that the camera 90 is used instead of the pressure sensor 54. When the head of the seated occupant moves leftward or rightward due to the acceleration in the left-right direction, in step 201, the camera 90 detects a moving direction and a movement amount of the head of the seated occupant. Then, a process proceeds to step 203 when it is detected in step 202 that the moving direction is the left direction, and the process proceeds to step 211 when the moving direction is not the left direction (when the moving direction is the right direction). In step 203, when the movement amount detected by the camera 90 is small (when the movement amount detected by the camera 90 is equal to or larger than a first predetermined value and equal to or lower than a second predetermined value), the process proceeds to step 204 in which the control device 80 operates the electric mechanism 70 to move the cushion body 50 by a small distance (for example, 10 mm) leftward. When the movement amount detected by the camera 90 is medium or large (when the movement amount detected by the camera 90 is larger than the second predetermined value), the process proceeds to step 205. In step 205, when the movement amount detected by the camera 90 is medium (when the movement amount detected by the camera 90 is equal to or larger than the second predetermined value and equal to or lower than a third predetermined value), the process proceeds to step 206 in which the control device 80 operates the electric mechanism 70 to move the cushion body 50 by a medium distance (for example, 25 mm) leftward. When the movement amount detected by the camera 90 is large (when the movement amount detected by the camera 90 is larger than the third predetermined value), the process proceeds to step 207 in which the control device 80 operates the electric mechanism 70 to move the cushion body 50 by a large distance (for example, 40 mm) leftward. After step 204, step 206, and step 207, the process proceeds to step 209. In step 209, whether the small movement, the medium movement, and the large movement are completed is determined based on the movement amount detected by the camera 90. When it is determined that the movement is completed, the process proceeds to step 210 in which the operation of the electric mechanism 70 is stopped. When it is not determined that the movement is completed, the process returns to step 201. Steps 211 to 215 are the same as the flow of steps 203 to 207 only except that the control device 80 operates the electric mechanism 70 to move the cushion body 50 rightward. In the other embodiment configured as described above, the same advantageous effects as those of the above-described embodiment can be attained. Here, the camera 90 corresponds to a "sensor" in the claims.

2. In the above embodiments, the movement of the head of the seated occupant is detected by the pressure sensor 54 or the camera 90. However, the present disclosure is not limited thereto, and the movement of the head of the seated occupant may be predicted based on information from the navigation system.

3. In the above embodiments, the base plate portion 41*a* of the frame main body 41 is formed in the rectangular shape. However, the shape is not limited to the rectangular shape, and may be any other shape as long as the cushion body 50 can be movably supported.

4. In the above embodiments, the front surface 41*a*6 of the base plate portion 41*a* is formed as a part of a curve which is convex toward the rear in top view as well as the groove bottom surface 41*a*71. However, the present disclosure is not limited thereto, and the front surface 41*a*6 of the base plate portion 41*a* may be formed as a part of a straight line as long as the cushion body 50 can be movably supported.

5. In the above embodiments, the slide trajectory of the slide body 42 relative to the frame main body 41 is formed as a part of the circular arc which has the radius of 400 mm and which is convex toward the rear and a part of the circular arc which has the radius of 1000 mm and which is convex toward the upper. However, the present disclosure is not limited thereto, and various forms, which are a quadratic curve, a circular arc, a combination of a curve which is a quadratic curve or the like and a straight line, or the like, can be applied as long as the slide body 42 is slidable relative to the frame main body 41.

6. In the above embodiments, the present disclosure is applied to the seat of the automobile. However, the present disclosure may be applied to a seat mounted on an airplane, a ship, a train, or the like.

The disclosure provides illustrative, non-limiting examples as follows:

A first aspect of the present disclosure provides a vehicle seat attachable to a vehicle body, the vehicle seat including: a seat back configured to support an upper body of a seated occupant; and a headrest configured to support a head of the seated occupant, the headrest including: a base portion fixed to the seat back; a slide portion slidable in a left-right direction of the seated occupant in a state where the head is supported to the base portion; and an electric mechanism configured to slide the slide portion in the left-right direction, and in which the slide portion is configured to be moved by the electric mechanism in a moving direction in which the head moves in the left-right direction due to acceleration in the left-right direction applied when a vehicle moves, the electric mechanism being operated by a control device disposed in the vehicle body in response to a signal from a sensor disposed in the vehicle body, the sensor being configured to detect the moving direction.

According to the first aspect of the present disclosure, when the upper body of the seated occupant moves in the left-right direction due to the acceleration in the left-right direction applied when the vehicle moves, the head of the seated occupant is moved by the slide portion in the moving direction of the left-right direction which is detected by the sensor. Accordingly, the head of the seated occupant is translated together with the upper body so that rotational movement of yawing relative to the headrest is less likely to occur. Therefore, discomfort to the seated occupant can be less likely to occur.

In a second aspect of the present disclosure, according to the first aspect of the present disclosure, the sensor is a pressure sensor disposed in the headrest and configured to detect pressure at which the head abuts on a surface of the headrest. The pressure sensor is configured to detect the moving direction by detecting a direction in which the pressure increases in the left-right direction.

According to the second aspect of the present disclosure, advantageous effects of the first aspect of the present disclosure can be attained with a simple structure in which the pressure sensor is disposed in the headrest.

In a third aspect of the present disclosure, according to the second aspect of the present disclosure, the electric mechanism is configured to be operated by the control device so as to increase a slide amount of the slide portion as the pressure detected by the pressure sensor increases.

According to the third aspect of the present disclosure, when the acceleration in the left-right direction applied during the movement of the vehicle is large, the head of the seated occupant is rotated more largely relative to the headrest and the pressure detected by the pressure sensor increases. At this time, the slide portion is slid so as to increase the sliding amount as the pressure increases. Therefore, the head of the seated occupant is translated together with the upper body, so that rotational movement of yawing relative to the headrest is less likely to occur.

In a fourth aspect of the present disclosure, according to the third aspect of the present disclosure, the electric mechanism is configured to be operated by the control device so as to slide the slide portion by a first slide amount in the left-right direction in a case where the pressure detected by the pressure sensor is equal to or larger than a first value and equal to or less than a second value, and slide the slide portion by a second slide amount larger than the first slide amount in the left-right direction in a case where the pressure detected by the pressure sensor is larger than the second value.

In a fifth aspect of the present disclosure, according to the first aspect of the present disclosure, the sensor is a camera configured to detect a slide movement of the head in the left-right direction.

According to the fifth aspect of the present disclosure, advantageous effects of the first aspect of the present disclosure can be attained with a simple structure in which the camera is disposed.

In a sixth aspect of the present disclosure, according to the fifth aspect of the present disclosure, the electric mechanism is configured to be operated by the control device so as to increase a slide amount of the slide portion as a movement amount of the head detected by the camera increases.

According to the sixth aspect of the present disclosure, when the acceleration in the left-right direction applied during the movement of the vehicle is large, the head of the seated occupant is rotated more largely relative to the headrest and the movement amount of the head detected by the camera increases. At this time, the slide portion is slid so as to increase the sliding amount as the movement amount of the head increases. Therefore, the head of the seated occupant is translated together with the upper body, so that rotational movement of yawing relative to the headrest is less likely to occur.

In a seventh aspect of the present disclosure, according to the sixth aspect of the present disclosure, the electric mechanism is configured to be operated by the control device so as to slide the slide portion by a first slide amount in the left-right direction in a case where the slide movement detected by the camera is equal to or larger than a first value and equal to or less than a second value, and slide the slide portion by a second slide amount larger than the first slide amount in the left-right direction in a case where the slide movement detected by the camera is larger than the second value.

In an eighth aspect of the present disclosure, according to any one of the first to seventh aspects of the present disclosure, a slide movement trajectory of the slide portion in the left-right direction projects forward as approaching end portions of the base portion in the left-right direction.

According to the eighth aspect of the present disclosure, when the head of the seated occupant is supported on the slide portion and slides in the left-right direction, the head of the seated occupant is supported to be projected forward as the head of the seated occupant approaches end portions of the slide movement trajectory in the left-right direction. Therefore, the head is supported from side surfaces in the left-right direction so that rotational movement of yawing is less likely to occur. Accordingly, the head of the seated occupant is less likely to rotate relative to the upper body, so that discomfort to the seated occupant can be less likely to occur.

In a ninth aspect of the present disclosure, according to the eighth aspect of the present disclosure, the slide movement trajectory projects downward as approaching the end portions of the base portion in the left-right direction.

According to the ninth aspect of the present disclosure, when the head of the seated occupant is supported on the slide portion and slides in the left-right direction, the head of the seated occupant is supported to be projected downward as the head of the seated occupant approaches end portions of the slide movement trajectory in the left-right direction. Therefore, the head moves integrally with the upper body so that the head of the seated occupant and the headrest are less likely to move relative to each other in the upper-lower direction. Accordingly, the head of the seated occupant is prevented from deviating relative to the headrest in the upper-lower direction, so that discomfort to the seated occupant can be less likely to occur.

An tenth aspect of the present disclosure provides a headrest attachable to a seat back which is configured to support an upper body of a seated occupant in a vehicle seat attachable to a vehicle body, and configured to support a head of the seated occupant, the headrest including: a base portion fixed to the seat back; a slide portion slidable in a left-right direction of the seated occupant in a state where the head is supported to the base portion; and an electric mechanism configured to slide the slide portion in the left-right direction, in which the slide portion is configured to be moved by the electric mechanism in a moving direction in which the head moves in the left-right direction due to acceleration in the left-right direction applied when a vehicle moves, the electric mechanism being operated by a control device disposed in the vehicle body in response to a signal from a sensor disposed in the vehicle body, the sensor being configured to detect the moving direction.

According to the tenth aspect of the present disclosure, when the upper body of the seated occupant moves in the left-right direction due to the acceleration in the left-right direction applied when the vehicle moves, the head of the seated occupant is moved by the slide portion in the moving direction of the left-right direction which is detected by the sensor. Accordingly, the head of the seated occupant is translated together with the upper body so that rotational movement of yawing relative to the headrest is less likely to occur. Therefore, discomfort to the seated occupant can be less likely to occur.

An eleventh aspect of the present disclosure provides a control system of a headrest attachable to a seat back which is configured to support an upper body of a seated occupant in a vehicle seat attachable to a vehicle body, wherein the headrest which is configured to support a head of the seated occupant includes: a base portion fixed to the seat back; a slide portion slidable in a left-right direction of the seated occupant in a state where the head is supported to the base portion; and an electric mechanism configured to slide the slide portion in the left-right direction, in which the control system includes: a control device disposed in the vehicle body; and a sensor disposed in the vehicle body and configured to detect a moving direction in which the head moves in the left-right direction due to acceleration in the left-right direction applied when a vehicle moves, and in which the control device is configured to operate the electric mechanism to move the slide portion in the moving direction in response to a signal from the sensor.

According to the eleventh aspect of the present disclosure, when the upper body of the seated occupant moves in the left-right direction due to the acceleration in the left-right direction applied when the vehicle moves, the head of the seated occupant is moved by the slide portion in the moving direction of the left-right direction which is detected by the sensor. Accordingly, the head of the seated occupant is translated together with the upper body so that rotational movement of yawing relative to the headrest is less likely to occur. Therefore, discomfort to the seated occupant can be less likely to occur.

What is claimed is:

1. A vehicle seat attachable to a vehicle body, the vehicle seat comprising:
    a seat back configured to support an upper body of a seated occupant; and
    a headrest configured to support a head of the seated occupant, the headrest including:
    a base portion fixed to the seat back;
    a slide portion slidable in a left-right direction of the seated occupant in a state where the head is supported to the base portion; and
    an electric mechanism configured to slide the slide portion in the left-right direction, and
    wherein the slide portion is configured to be moved by the electric mechanism in a moving direction in which the head moves in the left-right direction due to acceleration in the left-right direction applied when a vehicle moves, the electric mechanism being operated by a control device disposed in the vehicle body in response to a signal from a sensor disposed in the vehicle body, the sensor being configured to detect the moving direction.

2. The vehicle seat according to claim 1,
    wherein the sensor is a pressure sensor disposed in the headrest and configured to detect pressure at which the head abuts on a surface of the headrest, and
    wherein the pressure sensor is configured to detect the moving direction by detecting a direction in which the pressure increases in the left-right direction.

3. The vehicle seat according to claim 2,
    wherein the electric mechanism is configured to be operated by the control device so as to increase a slide amount of the slide portion as the pressure detected by the pressure sensor increases.

4. The vehicle seat according to claim 3,
    wherein the electric mechanism is configured to be operated by the control device so as to slide the slide portion by a first slide amount in the left-right direction in a case where the pressure detected by the pressure sensor is equal to or larger than a first value and equal to or less than a second value, and slide the slide portion by a second slide amount larger than the first slide amount in the left-right direction in a case where the pressure detected by the pressure sensor is larger than the second value.

5. The vehicle seat according to claim 1,
wherein the sensor is a camera configured to detect a slide movement of the head in the left-right direction.

6. The vehicle seat according to claim 5,
wherein the electric mechanism is configured to be operated by the control device so as to increase a slide amount of the slide portion as a movement amount of the head detected by the camera increases.

7. The vehicle seat according to claim 6,
wherein the electric mechanism is configured to be operated by the control device so as to slide the slide portion by a first slide amount in the left-right direction in a case where the slide movement detected by the camera is equal to or larger than a first value and equal to or less than a second value, and slide the slide portion by a second slide amount larger than the first slide amount in the left-right direction in a case where the slide movement detected by the camera is larger than the second value.

8. The vehicle seat according to claim 1,
wherein a slide movement trajectory of the slide portion in the left-right direction projects forward as approaching end portions of the base portion in the left-right direction.

9. The vehicle seat according to claim 8,
wherein the slide movement trajectory projects downward as approaching the end portions of the base portion in the left-right direction.

10. A headrest attachable to a seat back which is configured to support an upper body of a seated occupant in a vehicle seat attachable to a vehicle body, and configured to support a head of the seated occupant, the headrest comprising:
a base portion fixed to the seat back;
a slide portion slidable in a left-right direction of the seated occupant in a state where the head is supported to the base portion; and
an electric mechanism configured to slide the slide portion in the left-right direction,
wherein the slide portion is configured to be moved by the electric mechanism in a moving direction in which the head moves in the left-right direction due to acceleration in the left-right direction applied when a vehicle moves, the electric mechanism being operated by a control device disposed in the vehicle body in response to a signal from a sensor disposed in the vehicle body, the sensor being configured to detect the moving direction.

11. A control system of a headrest attachable to a seat back which is configured to support an upper body of a seated occupant in a vehicle seat attachable to a vehicle body, wherein the headrest which is configured to support a head of the seated occupant includes:
a base portion fixed to the seat back;
a slide portion slidable in a left-right direction of the seated occupant in a state where the head is supported to the base portion; and
an electric mechanism configured to slide the slide portion in the left-right direction,
wherein the control system comprises:
a control device disposed in the vehicle body; and
a sensor disposed in the vehicle body and configured to detect a moving direction in which the head moves in the left-right direction due to acceleration in the left-right direction applied when a vehicle moves, and
wherein the control device is configured to operate the electric mechanism to move the slide portion in the moving direction in response to a signal from the sensor.

* * * * *